United States Patent [19]

Stowe

[11] Patent Number: 4,948,272
[45] Date of Patent: Aug. 14, 1990

[54] PLASTIC HOUSING THRUST BEARING WITH COMPLETE SEALING

[75] Inventor: Keith A. Stowe, Sandusky, Ohio

[73] Assignee: General Motors Corporation, Detroit, Mich.

[21] Appl. No.: 329,454

[22] Filed: Mar. 28, 1989

[51] Int. Cl.[5] .......................... F16C 19/30; F16C 33/76
[52] U.S. Cl. ...................................... 384/607; 384/615
[58] Field of Search ............... 384/607, 609, 611, 615, 384/618, 620, 140, 482; 277/58, 95; 280/668

[56] References Cited

U.S. PATENT DOCUMENTS

| | | | |
|---|---|---|---|
| 2,639,954 | 5/1948 | Potter | 277/95 X |
| 2,678,246 | 1/1952 | Potter | 384/482 |
| 3,090,628 | 4/1957 | Giulietti | 277/95 X |
| 3,414,341 | 4/1966 | Murphy | 308/235 |
| 3,748,003 | 7/1973 | Barber | 384/482 |
| 3,811,744 | 5/1974 | Wren et al. | 308/235 |
| 3,847,456 | 11/1974 | Schwarzbich | 308/217 |
| 4,400,041 | 8/1983 | Lederman | 308/219 |
| 4,497,523 | 2/1985 | Lederman | 384/613 |
| 4,541,744 | 9/1985 | Lederman | 384/607 |
| 4,699,530 | 10/1987 | Satoh et al. | 280/668 X |
| 4,798,497 | 11/1987 | Lederman | 384/448 |

Primary Examiner—Daniel P. Stodola
Assistant Examiner—William G. Battista, Jr.
Attorney, Agent, or Firm—Patrick M. Griffin

[57] ABSTRACT

A thrust ball bearing for a McPherson strut provides rubbing seals that are integral with rigid plastic housings by making a pair of sealing flanges on the upper housing flexible enough to continuously engage a pair of sloped seal surfaces on the other housing.

3 Claims, 1 Drawing Sheet

PLASTIC HOUSING THRUST BEARING WITH COMPLETE SEALING

This invention relates to thrust bearings in general, and specifically to a thrust bearing that has, in addition to a complement of rolling elements, only two rigid plastic molded housings, but which still provides complete, continuous contact sealing.

BACKGROUND OF THE INVENTION

The addition of a rolling element thrust bearing at the turning junction between a front McPherson strut mount and the vehicle body provides a steering feel superior to a plain bearing, and several designs have been proposed therefore. An important design objective is to minimize components and provide unitization for ease of handling, since a rolling element bearing is inherently more expensive and more difficult to handle than a plain bearing. But rigorous sealing of the rolling elements still has to be provided, because of the harsh, under body environment.

One approach to unitization and simplification is to provide two basic housing units which snap together, sandwiching a complement of bearing balls between them as a unit. Several examples of such a bearing are disclosed in commonly assigned USPN 4,497,523 to Lederman. One or more of the housings may be molded of rigid plastic, which is strong enough to provide an integral pathway trough for a stamped metal race that in turn supports the balls. An example is shown in FIG. 2 of Lederman '523, where separate soft rubber O rings are used to seal each side of the bearing balls. In an alternate embodiment, FIG. 5, one of the housings is itself molded of softer rubber, which allows a pair of soft rubber sealing lips to be integrally molded with it. Another approach to component minimization and unitization may be seen in commonly assigned USPN 4,541,744 to Lederman. There, both housings are molded of rigid plastic, and snap fit together with a ball separating cage to create a unit. Sealing rings are eliminated by creating a labyrinth seal with flanges and grooves integrally molded to the housings. Of course, a labyrinth seal is not a complete or continuous seal, but rubbing seal friction is eliminated, and a labyrinth seal may be sufficient in certain applications.

SUMMARY OF THE INVENTION

The invention provides a ball thrust bearing in which the only basic components, other than the ball complement itself, are first and second housings molded of a plastic rigid enough to support the ball complement. Despite the rigidity of the plastic, other structure molded integrally with the housings also provides a complete rubbing seal bordering the ball complement.

The first, lower housing is generally annular in shape, with a central, trough shaped pathway that supports a metal race liner which, in turn, supports the lower side of the bearing ball complement. The pathway is bordered by a pair of seal surfaces, the inner one of which sloped radially inwardly and axially downwardly, while the outer one is sloped radially outwardly and axially downwardly. The second, upper housing is molded of the same material, with the same central pathway. The pathway of the upper housing is bordered by integrally molded, generally cylindrical, inner and outer sealing flange. The sealing flanges are sufficiently long and thin to be partially flexible, despite the rigidity of the plastic from which they are molded. The sealing flanges are also sufficiently long to assure that the lower edges thereof will contact a respective sloped sealing surface on the lower housing with axial and radial interference when the bearing is assembled. In addition, in the embodiment disclosed, the sealing flanges themselves are bordered by cylindrical, inner and outer shielding walls that create a slight radial and axial clearance with the lower housing when the bearing is assembled.

When the bearing is assembled, the resulting contact of the edges of the upper housing sealing flange edges with the lower housing sealing surfaces assures a complete, continuous seal interface around the bearing balls. Variations in the axial and radial position of the assembled housings are compensated for by the slope of the sealing surfaces, which will spread the sealing flanges apart to a greater or lesser degree, maintaining continuous contact. In addition, the shielding flanges on the upper race protect the sealing flanges, and create a labyrinth seal bordering the rubbing seal.

It is, therefore, an object of the invention to provide for a complete, continuous contact seal in a ball thrust bearing having rigid plastic housings, without providing softer material seals as separate components.

It is another object of the invention to provide such a complete, continuous seal by molding partially flexible, axially depending cylindrical sealing flanges on one housing bordering its pathway that engage a pair of outwardly sloped sealing surfaces bordering the pathway of the other housing to create an assured seal.

DESCRIPTION OF THE PREFERRED EMBODIMENT

These and other objects and features of the invention will appear from the following written description, and from the drawings, in which:

FIG. 1 a a perspective cross sectioned view of a preferred embodiment of the invention;

Figure 1:
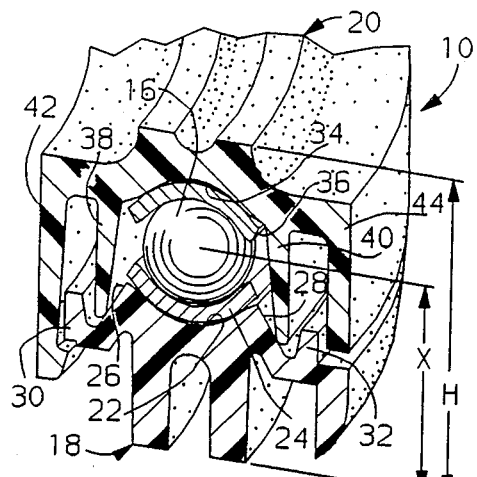
Figure 3:
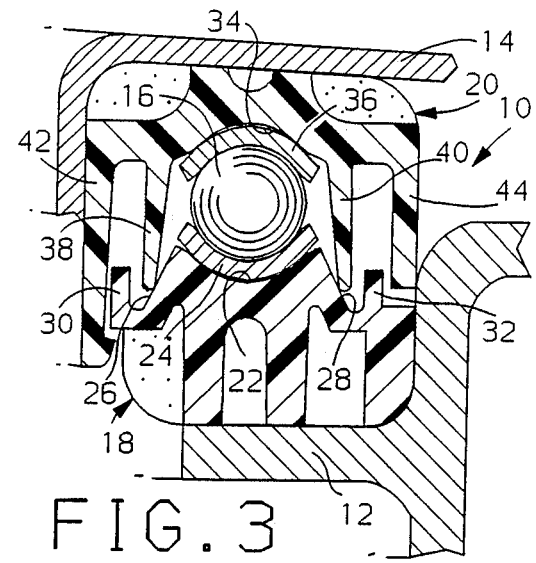
FIG. 3 shows a portion of a McPherson strut with the bearing installed.

Referring first to FIGS. 1 and 3, a preferred embodiment of the ball thrust bearing of the invention, designated generally at 10, is installed between relatively turning lower 12 and upper 14 plates of a McPherson strut. Bearing 10 is subjected to dirt, water, road spray and salt, so rigorous sealing is needed. As plates 12 and 14 turn, they are also subject to heavy, shifting strut loads that compress the components of bearing 10, loads that may also have a radial component tending to misalign the components of bearing 10. So any seal in bearing 10 must withstand those forces, and still maintain the sealing contact. The preferred embodiment of bearing 10 does so with a minimal number of components. The basic components include a full complement of bearing balls 16 arranged in a circle about a central axis of bearing 10, a lower housing designated generally at 18, and an upper housing designated generally at 20. Details of the basic components are described next.

Figure 2:
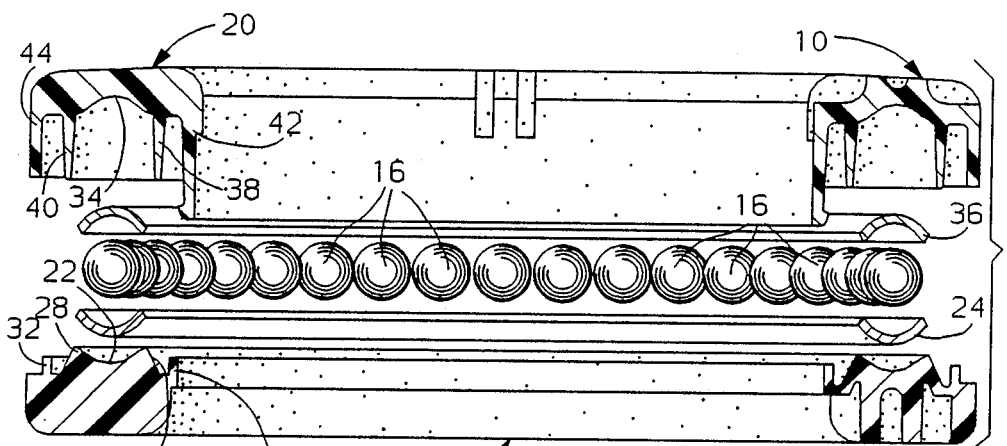
FIG. 2 is an exploded and cross sectioned view of the various components of the bearing.

Referring next to FIGS. 1 and 2, lower housing 18 is generally annular in shape, and is molded in one piece of a rigid plastic material. It includes a generally trough shaped central pathway 22 of symmetrical cross section that conforms to and supports a stamped steel race liner 24. It is the race liner 24 that directly contacts the lower axial side of the ball complement 16, but the molded pathway 22 must be rigid enough to at least indirectly support the loads seen by the balls 16 without deforming to a great extent. The pathway 22 is bordered by a pair of troughs of asymmetrical cross section comprised of inner and outer steeply sloped sealing surfaces 26 and 28 respectively, which merge into an innermost and an outermost upstanding lip 30 and 32 respectively. Inner seal surface 26 is sloped radially inwardly and axially downwardly, while outer seal surface 30 is sloped radially outwardly and axially downwardly. Since none of the surfaces of lower housing 18 have any return bends or undercuts relative to the axis of bearing 10, it may be molded by a single pair of mold halves that part along that axis, known as by pass molding.

Still referring to FIGS. 1 and 2, upper housing 20 is molded of the same material and has an identical shape pathway 34, which supports an identical race liner 36 for the upper axial side of the ball complement 16. However, upper housing pathway 34 is located higher up within bearing 10 than is lower housing pathway 22, off center. Stated differently, the location of the central plane of the ball complement 16 measured from the bottom of bearing 10, indicated at X in FIG. 1, is more than half of the total height H of bearing 10, which serves a purpose described below. Upper housing pathway 34 is also bordered by a pair of generally cylindrical sealing flanges, specifically an inner flange 38 and an outer flange 40. Although they are integrally molded of the same rigid plastic as upper housing 20, flanges 38 and 40 sufficiently long and thin to be partially flexible. The sealing flanges 38 and 40 are each also sufficiently long to assure that their lower edges contact a respective sloped sealing surface 26 and 28 on lower housing 18 with a slight axial and radial interference. In the embodiment disclosed, the sealing flanges 38 and 40 are themselves bordered, by inner and outer, generally cylindrical shielding walls 42 and 44. Inner shielding wall 42 is longer than the sealing flange 38, and is barbed at its lower edge. Outer shielding wall 44 is approximately the same length as outer sealing flange 40. As with lower housing 18, the surfaces of lower housing 20 are configured such that it can be effectively by pass molded. While the barbed lower edge of inner shielding wall 42 does present an undercut, it is long enough to be flexible enough to pop out of the mold without damage. The assembled housings 18 and 20 cooperate to provide sealing as is next described.

Figure 4:
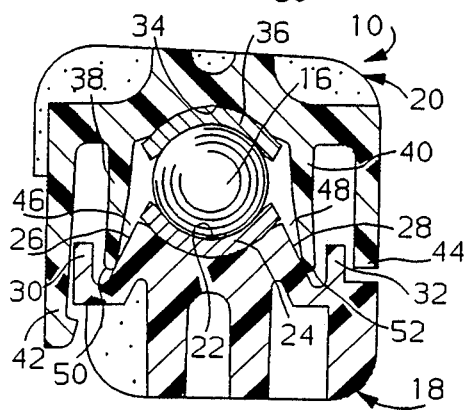
FIG. 4 is a cross sectional view showing a condition where the bearing is heavily loaded.
Figure 5:
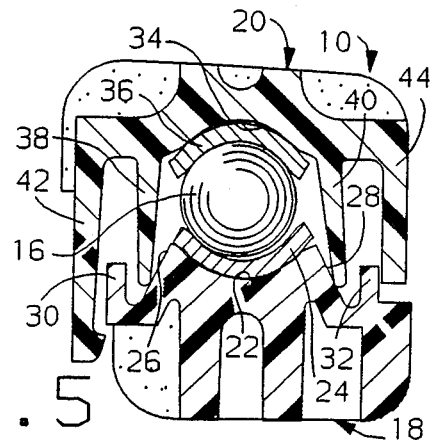
FIG. 5 is a view like FIG. 4 showing the condition of radial misalignment.

Referring next to FIGS. 1, 4 and 5, bearing 10 is assembled by pushing the housings 18 and 20 axially together, sandwiching the ball complement 16 between the race liners 24 and 36. The barbed lower edge of inner shielding wall 42 snaps past the inner diameter of lower housing 18, thereby retaining all components together as a unit. The lower edge of each sealing flange 38 and 40 engages a respective sealing surface 26 and 28, giving a complete seal interface surrounding the ball complement 16. Because of the deliberate axial interference and the slope of the seal surfaces 26 and 28, they spread the flanges 28 and 40 radially apart slightly from their free molded state. By placing the upper housing pathway 34 high, and by steeply sloping the lower housing seal surfaces 26 and 28, it is assured that the sealing flanges 38 and 40 are relatively long compared to their thickness, which adds to their flexibility. That flexibility, in turn, helps assure that the seal is maintained under all conditions. Thus, in FIG. 4, the condition is shown where the housings 18 and 20 have been pushed closer together by a compressive load. The edges of the sealing flanges 38 and 40 have simply moved farther down the respective sloped sealing surfaces 26 and 28, spreading them radially apart farther. Furthermore, as seen in FIG. 5, should a radial load shift the lower housing 20 radially to the right slightly, the misalignment is compensated for by the inner sealing flange 38 flexing back in slightly, and the outer sealing flange 40 flexing out more, maintaining complete sealing contact. These same features could also compensate for axial and radial tolerance variations in the housings 18 and 20.

Referring next to FIG. 4, sealing is aided by the fact that the orientation of the flanges 38 and 40 and the sloped sealings surfaces 26 and 28 create, in effect, inner and outer grease reservoirs 46 and 48, from which wetting lubricant would be continually fed down into the sealing contact interface to reduce wear. In addition, the axial and radial clearance between the shielding walls 42 and 44, and the inner and outer lips 30 and 32 create a non rubbing labyrinth seal at the inner and outer perimeter of the bearing 10, presenting a tortuous patch to prevent abrasives entering and from reaching the sealing interface. The length of the seal surfaces 26 and 28 is sufficient that there is also an inner and outer gutter 50 and 52 created below the sealing interfaces that collect any abrasives that do enter, keeping them from the sealing interface. And, any grease that does get through the sealing interface from the reservoirs 46 and 48 will tend to pack the gutters 50 and 52, protecting the outside of the sealing interface. Furthermore, the thicker shielding walls 42 and 44 protect the inner sealing flanges 38 and 40 from impact damage. Therefore, the particular structural features of just two by pass moldable plastic housings 18 and 20 cooperate in numerous ways to assure continuous sealing.

Variations in the preferred embodiment could be made. Most generally, the housings 18 and 20 could be reversed, although the reservoirs 46 and 48 and the gutters 50 and 52 would not then work with the assistance of gravity. The housing pathways 22 and 34 could be oriented so as to place the ball pathway conventionally in the center plane of bearing 10. Raising the ball complement 16 up, however, allows the seal surfaces 26 and 28 to slope down farther, thereby allowing the flanges 38 and 40 to be longer, which adds advantageously to their flexibility, as well as cooperating to create the grease reservoirs 46 and 48 and protective gutters 50 and 52. The shielding walls 42 and 44 and facing lips 30 and 32 are not necessary to the basic sealing function, but they are simple to integrally mode with the housings 18 and 20, and do provide the several advantageous features of impact protection and labyrinth seal. Thus, it will be understood that it is not intended to limit the invention to just the embodiment disclosed.

a lower, generally annular housing molded of a plastic sufficiently rigid to have an integrally molded lower pathway for supporting the lower side of said rolling elements, said lower pathway further being bordered by an inner, radially inwardly and axially downwardly sloping seal surface, and an outer, radially outwardly and axially downwardly sloping seal surface, each of which in turn is bordered by an inner and an outer upstanding lip, and, an upper, generally annular housing also molded of a plastic sufficiently rigid to have an integrally molded upper pathway for supporting the upper side of said rolling elements, said upper pathway further being bordered by inner and outer sealing flanges sufficiently long and thin to be partially flexible, with the lower edges of said flanges contacting a respective inner and outer seal surface of said lower housing with an axial and radial interference sufficient to in turn assure a continuous sealing interface therebetween, said flanges further being bordered by an inner and outer cylindrical shielding wall that creates a slight radial and axial clearance with said lower housing inner and outer lips, whereby, complete sealing of said rolling elements is assured with a minimal number of components, with said sealing interface further being protected by said shielding walls and the slight clearance they create with said lips.

The embodiments of the invention in which an exclusive property or privilege is claimed are defined as follows:

1. A bearing having a circular complement of rolling elements arranged about an axis of said bearing for supporting an axial load, comprising,
   a first, generally annular housing molded of a rigid plastic with an integrally molded first pathway for supporting one side of said rolling elements, said first pathway further being bordered by an inner, radially and axially sloping seal surface, and an outer, radially and axially sloping seal surface, said seal surfaces further being integrally molded to said first housing of the same rigid plastic, and,
   a second, generally annular housing also molded of a rigid plastic with an integrally molded second pathway for supporting the other side of said rolling elements, said second pathway further being bordered by an inner and outer pair of generally cylindrical, integrally molded sealing flanges of the same rigid plastic, said inner and outer sealing flanges further being sufficiently long and thin to be partially flexible, with the terminal edges of said flanges contacting the respective inner and outer sloping seal surfaces of said first housing with an axial and radial interference sufficient to in turn assure continuous sealing interface therebetween,
   whereby complete sealing of said rolling elements is assured with a minimal number of components.

2. A bearing having a circular complement of rolling elements arranged about an axis of said bearing for supporting an axial load, comprising,
   a lower, generally annular housing molded of a rigid plastic with an integrally molded lower pathway for supporting the lower side of said rolling elements, said lower pathway being located above a central plane of said bearing and further being bordered by an inner, radially inwardly and axially downwardly sloping seal surface, and an outer, radially outwardly and axially downwardly sloping seal surface, said seal surfaces further being integrally molded to said lower housing of the said rigid plastic, and,
   an upper, generally annular housing also molded of a rigid plastic with an integrally molded upper pathway for supporting the upper side of said rolling elements, said upper pathway further being bordered by a pair of inner and outer generally cylindrical, integrally molded sealing flanges of the same rigid plastic, said inner and outer sealing flanges further being sufficiently long that the lower edges thereof flexibly contacting the respective inner and outer sloping seal surfaces of said lower housing with an axial and radial interference sufficient to in turn assure a continuous sealing interface therebetween,
   whereby, complete sealing of said rolling elements is assured with a minimal number of components.

3. A bearing having a circular complement of rolling elements arranged about an axis of said bearing for supporting an axial load, comprising,
   a lower, generally annular housing molded of a rigid plastic with an integrally molded lower pathway for supporting the lower side of said rolling elements, said lower pathway further being bordered by an inner, radially inwardly and axially downwardly sloping seal surface, and an outer, radially outwardly and axially downwardly sloping seal surface, each of which in turn is bordered by an inner and an outer upstanding lip, said seal surfaces and lips further being integrally molded to said lower housing of the same rigid plastic, and,
   an upper, generally annular housing also molded of a rigid plastic with an integrally molded upper pathway for supporting the upper side of said rolling elements, said upper pathway further being bordered by inner and outer sealing flanges integrally molded to said upper housing of the same rigid plastic and further being sufficiently long and thin to be partially flexible, with the lower edges of said flanges contacting the respective inner and outer sloping seal surfaces of said lower housing with an axial and radial interference sufficient to in turn assure a continuous sealing interface therebetween, said flanges further being bordered by an inner and outer cylindrical shielding wall that creates a slight radial and axial clearance with said lower housing inner and outer lips,
   whereby, complete sealing of said rolling elements is assured with a minimal number of components, with said sealing interface further being protected by said shielding walls and the slight clearance they create with said lips.

* * * * *